United States Patent [19]

Reese

[11] 3,969,099
[45] July 13, 1976

[54] BUSHING ENVIRONMENTAL CONTROL SYSTEM
[75] Inventor: Walter J. Reese, North Huntington, Pa.
[73] Assignee: PPG Industries, Inc., Pittsburgh, Pa.
[22] Filed: Oct. 7, 1974
[21] Appl. No.: 512,647

[52] U.S. Cl. .......................................... 65/2; 65/12
[51] Int. Cl.² ........................................ C03B 37/02
[58] Field of Search .................... 65/2, 12, 5, 16

[56] References Cited
UNITED STATES PATENTS

| | | |
|---|---|---|
| 3,068,670 | 12/1962 | Russell .................................. 65/12 |
| 3,256,078 | 6/1966 | Drummond .............................. 65/2 |
| 3,288,581 | 11/1966 | Schweppe ................................. 65/2 |
| 3,304,163 | 2/1967 | Holschlag ........................... 65/12 X |

Primary Examiner—Robert L. Lindsay, Jr.
Attorney, Agent, or Firm—John E. Curley

[57] ABSTRACT

A process is described for controlling the air environment around a fiber glass forming station. The process involves the use of high pressure air and an air manifold system to control air supply and velocities around a fiber glass bushing and in the area immediately below it to improve the call down rate and short term yardage characteristics of the yarn produced.

9 Claims, 3 Drawing Figures

BUSHING ENVIRONMENTAL CONTROL SYSTEM

BACKGROUND OF THE INVENTION

In the manufacture of continuous glass fibers, glass filaments are typically formed by drawing them from a source of molten glass. The molten glass source is a container conventionally constructed of platinum or a platinum alloy and provided with a multiplicity of orifices or hollow tips at the bottom. The molten glass flows from the bushing through the orifices and/or tips and is attenuated by wheel pullers, winders and other similar devices at high speed. The filaments so drawn from a bushing are then typically collected on a package contained on the winder surface.

Glass filaments in industry today are drawn at very high rates of speed thus creating considerable air turbulence in the area of the bushing. As glass fiber bushings have increased in size and attenuation speeds have increased to 1,524 to 6,096 meters per minute or more, difficulties have been encountered in controlling the short yardage characteristics of glass fiber yarns and call down rates are often below acceptable values. It is believed that these and many other associated problems are caused by erratic air velocity conditions in and around the bushing tips and the area immediately below the tips.

THE PRESENT INVENTION

In accordance with the present invention a method of improving bushing environment is provided in which the air supply in and around the bushing tips and the area immediately below these tips is controlled to insure more uniformity in a vertical direction from the bushing to the applicator. Better short term yardage is realized with the controlled air supply system of the invention as well as increased call down efficiency. The system has proven to be a particularly effective one in improving the operating efficiencies of glass fiber forming operations which are conducted on a double level.

In accordance with the instant invention, a high pressure air source is utilized to supply air to a fiber glass forming bushing station, in large volumes. The air source includes a compressed air supply system and a manifold system for distributing the air to the bushing. The air fed to the fiber glass bushing is fed at about a right angle to the bushing tips and is spaced from the edge of the bushing by about 20 centimeters. The manifold is constructed of sufficient width that the air supply is directed to the entire width of the bushing bottom and its associated tips to provide an equal flow of air across the bottom of the bushing and preferably at the right angle thereto.

For a more complete understanding of the invention, reference is made to the accompanying drawings in which.

Figure 1:
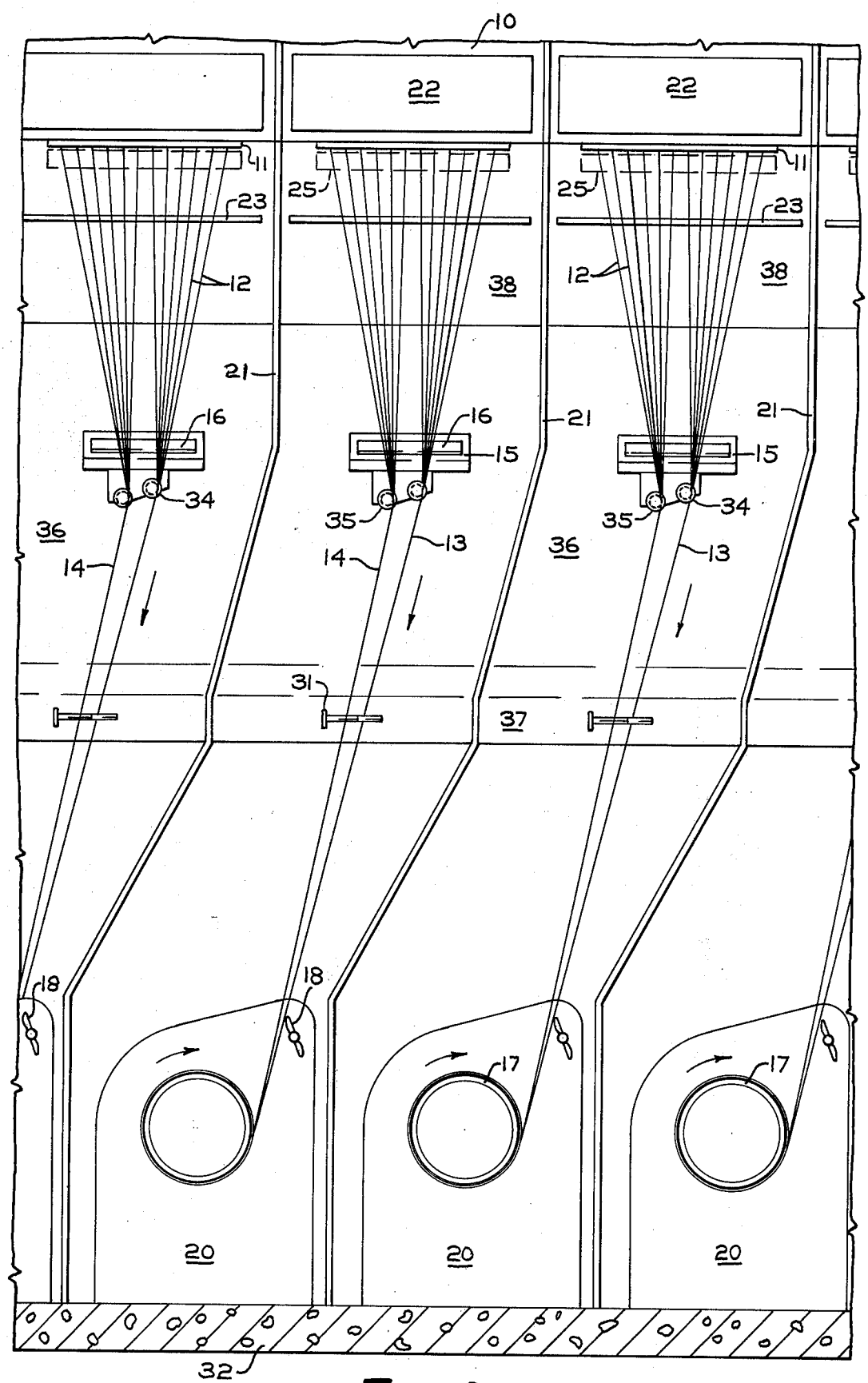
FIG. 1 is a front elevational view of a plurality of glass fiber forming stations.
Figure 2:
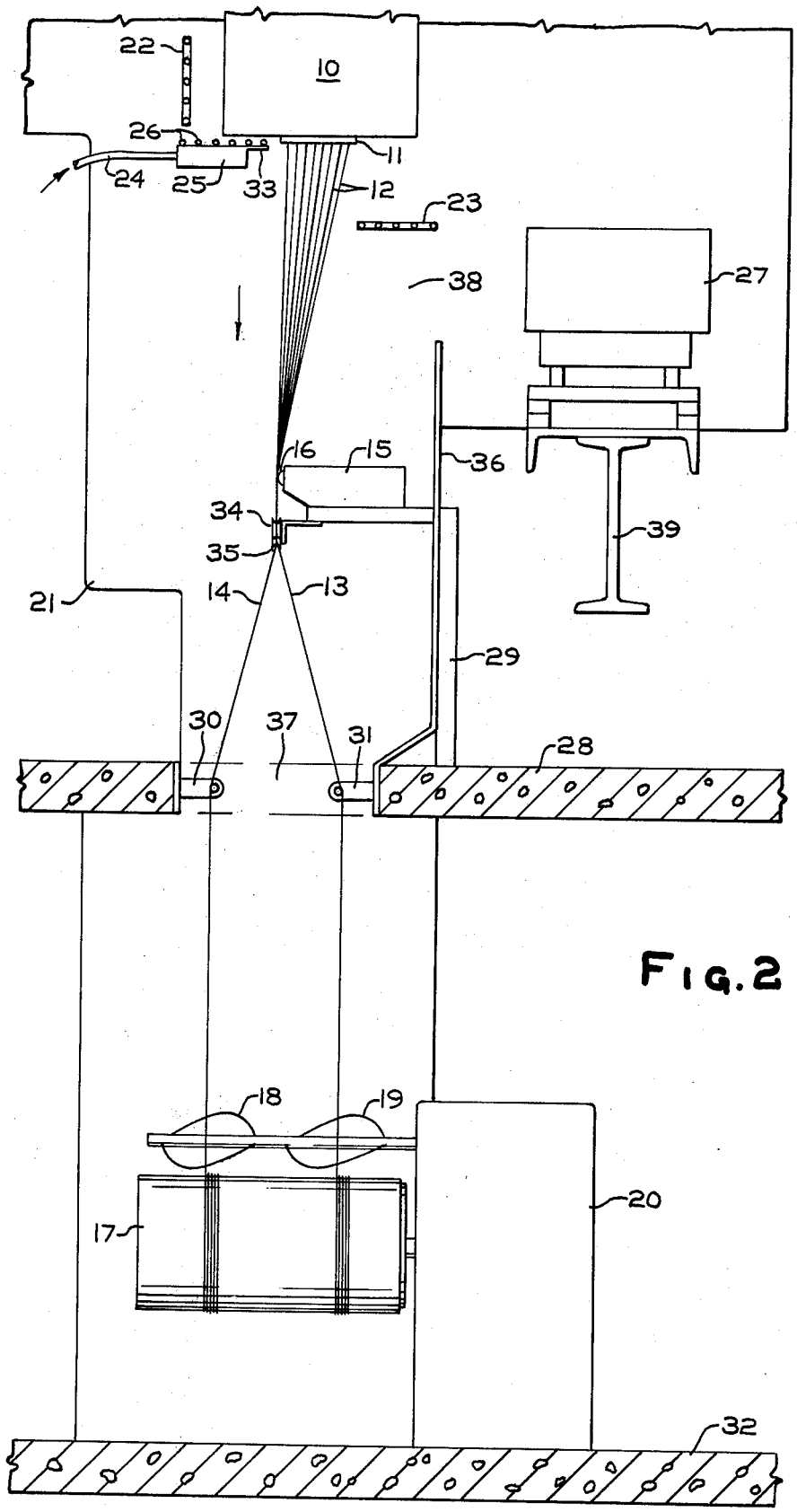
FIG. 2 is a side view of one of the glass fiber forming stations depicted in FIG. 1.

Turning to the drawings, and FIGS. 1 and 2 in particular, there is shown therein a molten glass supply source 10 which is a bushing block communication with a furnace forehearth (not shown). This block 10 is a ceramic structure with a central cavity therein which communicates with an opening in the forehearth at the top and with the bushing 11 at the bottom. In practice, the forehearth and the interior of the bushing 11, opening are dimensioned to conform to the dimensions of the canal in the bushing block 10. A plurality of glass fibers 12 are shown emanating from the bottom of the busing 11 through appropriate holes or tips (not shown) located in the bottom of the bushing 11. The fibers 12 are drawn across the face of a roller 16 positioned in an applicator housing 15 mounted on a stand 29. The roller 16 applies sizes or binders to the filaments 12 as they pass over its surface from a size or binder supply which is contained in housing 15.

In the embodiment shown in the drawings, the filaments 12 are then split and passed through two gathering shoes 34 and 35 to provide by consolidation of the split filaments 12, two fiber glass strands 13 and 14. Strand 13 passes through a guide member 31 and engages a spindle 19 prior to being wound on the back half of the winding device 17. Strand 14 passes through guide 30, engages spindle 18 and is wound on the front half of the winder 17. The winder 17 is driven by a motor positioned in housing 20 and may be a stationary winder or one which reciprocates in a horizontal direction. Similarly, spindles 18 and 19 may be stationary or may be of the reciprocating type.

As can be appreciated from the drawing, the winder is located on a floor 32 and the forming station which houses the bushing 11, applicator 15, gathering shoes 34 and 35 is located on the upper floor 28. The strands 30 and 31 pass to the winder 17 on the lower floor 32 through a suitable opening 37 in the floor 28.

Positioned in front of the bushing as shown in FIG. 2 is an air manifold 25 which has an air supply line 24 connected to the back end thereof. A thermal shield 33 is provided over the front end of the manifold 25 and the top of the manifold 25 has positioned thereon a plurality of cooling coils 26 which are constantly supplied with a cooling media such as water (not shown) during the operation of the air supply manifold 25.

The panels 21 are dividers which physically separate each of the adjacent forming stations from each other as shown in FIG. 1. In front and above each of the bushings 11 there is a cooling panel 22 provided with cooling coils through which water or other coolants flow to protect the operators from the intense heat of the forehearth located above the bushing 11. A similar cooling panel 23 is located in the back of each forming station. Also located in the back of the forming station is a transformer 27 mounted on a stand 39 which is used to supply current to the bushing 11 to maintain molten glass temperatures at the desired values for proper fiberization. The leads from the transformer to the bushing have been omitted to simplify the drawing since they form no part of the instant invention. The forming station is also provided with a back wall 36 which is open at 38 and in the area above the panel 23.

Figure 3:
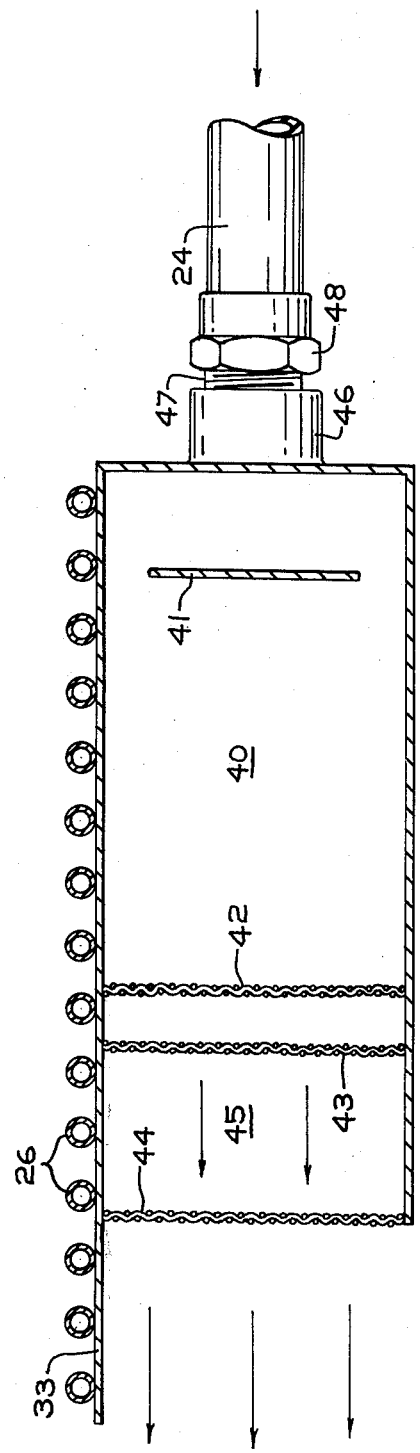
FIG. 3 is a cross-sectional side view of the air manifold system employed in the instant invention.

Air manifold 25 is shown in more detail in FIG. 3. As shown in that figure the manifold 25 has a main chamber 40 into which air is fed through air supply line 24. Supply line 24 is coupled to the housing of the manifold 25 by attaching it to the nipple 46 through a threaded bolt 47 and coupling nut 48. The air entering chamber 40 is diverted around a baffle 41, irregularly deflected by screens 42 and 43 which are 50 mesh stainless steel screens and into chamber 45. The air is then irregularly deflected by a screen 44 and out of the unit under thermal shield 33 in the direction shown by the arrows.

In the practice of the instant invention, molten glass is passed through the bushing block 10 into the bushing 11 where it is maintained molten by heating elements associated with the bushing. Typically these bushings operate at temperatures of between 1149°C. and 1260°C. Filaments 12 are attenuated from the bottom orifices or tips of the bushing 11 by the forces applied to them from the winder 17. Typically the filaments 12 are drawn from bushing 11 at rates of between 1524 and 6096 meters per minute, preferably between 3048 and 5486 meters per minute.

Air from a compressed air supply is fed to the manifold at gauge pressures between 27,579 Pascal and 137,895 Pascal, preferably about 82,737 Pascal to about 96,526 Pascal. The air supply volume passed to the edge of the bushing 11 from the manifold 25 is about 0.850 to about 1.982 cubic meters per minute, preferably about 1.274 to about 1.416 cubic meters per minute. The end of the manifold 25, i.e., the screen 44 is positioned at a point about 20.32 centimeters from the edge of the bushing 11 but can be located farther away, i.e., 30.48 to 60.96 centimeters and still operate effectively.

In a demonstration of the invention a series of runs were made on a double level 800 hole bushing 11 such as shown in FIG. 1 and FIG. 2 constructed to produce double DE 150 strand. Each of these DE strands had 400 filaments therein with the filaments having diameters of 0.000635 centimeter and 13,716 meters of yarn per 0.454 kilogram of glass. The 150 designation is derived from the English unit designation of this yarn as one possessing 15,000 yards of yarn per pound of glass.

The air manifold 25 was placed about 20.32 centimeters from the front of the bushing 11 and air pressures were varied from 41,368 Pascals to 96,526 Pascals. The strands were collected on high speed winders 17 with the strand speed approximately 4267 to 4876 meters per minute. Three minute packages were collected on the front and back half of the winder 17. These packages were then removed and subjected to a Uster test and weaving evaluation. Table I is a compilation of the runs made, pressures used and the results of the yarn evaluations made on the packages formed.

TABLE I

| Run | Air Pressure to Manifold (Pascal) | Package Location On Winder | Percent Uster * | Fabric ** Grade |
|---|---|---|---|---|
| 1 | 41,368 | Front | 1.60 | B/C |
|   |        | Back  | 1.80 | A/B |
| 2 | 55,158 | Front | 1.80 | B/C |
|   |        | Back  | 1.55 | B   |
| 3 | 68,947 | Front | 1.45 | A/B |
|   |        | Back  | 1.70 | B/C |
| 4 | 82,737 | Front | 1.70 | A/B |
|   |        | Back  | 1.60 | B   |
| 5 | 96,526 | Front | 1.35 | A/B |
|   |        | Back  | 1.60 | A/B |

* The measurement of the deviation in denier on a plurality of forming packages
** Visual evaluation of appearance of fabric woven from the yarn. A is the best rating.

In another demonstration of the process of the instant invention a series of runs were made on an 800 hole bushing producing single strand DE 75 glass strands to determine the productivity in kilograms per hour of the system of the instant invention compared with the conventional operation which did not utilize the positive air addition. The glass filaments were 0.000635 centimeter in diameter and the yarn was characterized by having 6,858 meters of yarn per pound of glass. Table II shows the results of these runs.

TABLE II

| Run * | Wet Pack (Kg./hr.) | Pack Call Down Rate (%) |
|---|---|---|
| 1 | 11.79 | 33.4 |
| 2 | 12.34 | 37.8 |
| 3 | 13.34 | 41.6 |
| 4 | 14.79 | 46.8 |
| 5 | 14.46 | 44.7 |
| 6 | 14.46 | 54.4 |
| 7 | 13.60 | 48.1 |
| 8 | 13.65 | 43.0 |
| 9 | 14.06 | 41.8 |

* Runs 1 and 2 were made without any air supply manifold employed. Runs 3 through 9 used the air manifold of the invention at 96,526 Pascal pressure and a volume of 14.16 cubic meters per minute. All run results are the averages of a one week production run.

As can be readily observed, the call down rate was increased significantly in the runs utilizing the air manifold and supply system of the instant invention over those runs not employing this auxiliary air supply. The call down rate is the percent of packages wound to full weight without an interruption in production. Also it is to be noted that the kilograms of glass yarn or strand wound per hour was improved considerably using the instant invention over the amounts realized with the conventional system that did not employ the auxiliary air supply.

Thus, it can be readily seen that the use of an auxiliary air supply system which provides a steady state air supply directed at the bushing across the bottom and at about right angles thereto in substantial volume produces an effect on bushing operation that produces good yarn, at high productivity with process interruptions considerably curtailed.

It appears that the introduction of the auxiliary air supply at the level of the bushing in a substantial volume has the effect of smoothing out the air velocities encountered around and below bushing in the forming station area. Stabilization of the air currents moving down from the bushing to the floor area of the forming station it is believed is responsible for the uniformity of product made during the practice of the invention as well as the increase in call downs experienced.

While the invention has been descirbed with reference to certain specific embodiments, it is not intended that it be limited thereby except insofar as appears in the accompanying claims.

I claim:

1. In the manufacture of glass fibers comprising attenuating glass fibers from molten glass through bushing tips; the improvement comprising passing directly at about right angles to the bushing tips and at a level with or slightly below said tips, a gaseous fluid as a stream, said gaseous fluid being passed thereto from a pressurized means for supplying said gaseous fluid; passing said gaseous fluid through a chamber having a baffle plate followed by a plurality of screens to divert and irregularly deflect said gaseous fluid before release to said bushing tips to provide an even flow of gaseous fluid across the length of the bushing.

2. In the manufacture of glass fiber strand wherein a plurality of glass filaments are attenuated downwardly at high speed from molten glass in a bushing and wound on a rotating surface; the improvement comprising feeding at right angles to the bushing and in the same plane that the filaments are being formed from said bushing, a uniform stream of air at a volume of between about 0.850 and about 1.982 cubic meters per minute, said stream of air being formed by passing said stream through a chamber having a baffle plate followed by a plurality of screens to divert and irregularly deflect said air, said air being fed from a means for supplying air operating at a gauge pressure of about 27,577 pascals to about 137,895 pascals, passing the said air stream across the bottom of the bushing and downwardly in the direction the filaments are traveling and feeding the air stream during the formation of the filaments continuously.

3. A method of operating a glass fiber forming operation wherein molten glass from a glass fiber bushing having a multiplicity of tips on the bottom thereof is drawn from said tips into a plurality of filaments at high speeds, said filaments are passed over an applicator to apply size or binder thereto, said filaments are gathered into strand and said strand is wound on a forming package, the improvement comprising providing a pressurized means for supplying air at right angles to the bottom of said bushing, operating said means at gauge pressure of between about 27,579 and about 137,895 pascals, passing said air through a chamber having a baffle plate followed by a plurality of screens to divert and irregularly reflect said air from said means for supplying air to provide a uniform gaseous air stream, feeding said uniform air stream across the bottom of said bushing at a volume of between about 0.850 and 1.982 cubic meters per minute while attenuating fibers at speeds of between about 1,524 and about 6,096 meters per minute or more, and removing the air stream so directed from adjacent the bushing by drawing it in a downward direction with the filaments.

4. In a fiber flass forming operation wherein a plurality of glass filaments are attenuated continuously at high speeds from orifices at the bottom of a fiber glass bushing containing molten glass, said filaments are sized and gathered into strand on one operating level, said strand is passed to a lower level where it is wound on a forming tube which supplies the high speed attenuation forces and wherein the high speed attenuation causes ambient air to travel downwardly with the filaments and strand from the upper level to the lower level the improvement comprising passing air through a chamber having a baffle plate followed by a plurality of screens to divert and irregularly deflect said air, said air being fed from a means for supplying said air at a guage pressure of between about 27,579 pascals and about 137,895 pascals and at right angles to the bushing, and directing the resulting air stream across the bottom of said bushing at a rate of about 0.850 to 1.982 cubic meters per minute to thereby provide additional air across the bushing bottom, said additional air being removed from the bushing continuously by flowing downwardly with the filaments and strand from one level to the lower level.

5. In the manufacture of glass fiber strand for textile use wherein a plurality of glass filaments are drawn continuously from orifices in the bottom of a glass fiber bushing continuously supplied with molten glass, said filaments being sized and gathered after sizing into two strands, said strands being wound on a single forming tube, and wherein said filaments are being drawn at a rate of about 1,524 to about 6,096 meters per minute, the improvement comprising passing air through a chamber having a baffle plate followed by a plurality of screens to divert and irregularly deflect said air from a means for supplying said air to produce an air stream and passing the resulting air stream at right angles to the bottom of said bushing and across the entire surface of said bushing, said means for supplying air operating at a guage pressure of between about 41,368 and about 96,526 pascals and the said air stream being fed across the bottom of the bushing being fed at a rate of between about 0.850 and about 1.982 cubic meters per minute, said air stream being continued until sufficient strand is wound on said forming tube.

6. In the method of manufacturing glass fibers by drawing molten glass through bushing tips along a linear path extending through said tips, the improvement comprising the steps of:
   a. introducing a pressurized gaseous fluid into one end of a confined region having a longitudinally extending axis that is substantially normal to the linear path extending through the bushing tips and at a level with or slightly below the tips,
   b. disposing a baffle plate means in and traversely to the path of movement of said pressurized gaseous fluid to form diverted streams of flowing pressurized gaseous fluid in said confined region,
   c. disposing at least one deflecting screen means between said baffle plate means and said bushing tips in and across said confined region to convert said diverted streams of flowing pressurized gas into a substantially even flowing stream of pressurized gaseous fluid extending across said confined region, and
   d. releasing said even flowing stream of pressurized gaseous fluid from said confined region and directing said stream across the length of the bushing.

7. The method of claim 3 wherein the filaments are split into two strands prior to collecting the strands.

8. The method of claim 4 wherein said filaments are gathered into two strands and the two strands so formed are wound on said forming tube.

9. The method of claim 4 wherein the air stream is designed to provide a flow of air at right angles to the bushing which flows air across the entire bushing length.

* * * * *